US012584444B2

(12) United States Patent
Yazici et al.

(10) Patent No.: US 12,584,444 B2
(45) Date of Patent: Mar. 24, 2026

(54) SUCTION ENABLED POST SHUTDOWN COMBUSTOR COOLING AND CORE VENTILATION

(71) Applicant: RTX Corporation, Farmington, CT (US)

(72) Inventors: Murat Yazici, Glastonbury, CT (US); Jeffrey T. Morton, Manchester, CT (US); Konstantinos P. Giannakopoulos, Middletown, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/818,853

(22) Filed: Aug. 29, 2024

(65) Prior Publication Data

US 2026/0063073 A1     Mar. 5, 2026

(51) Int. Cl.
| | |
|---|---|
| *F02C 7/18* | (2006.01) |
| *B64D 33/08* | (2006.01) |
| *F01D 25/12* | (2006.01) |
| *F02C 9/18* | (2006.01) |
| *F01D 21/00* | (2006.01) |

(52) U.S. Cl.
CPC ............... *F02C 7/18* (2013.01); *B64D 33/08* (2013.01); *F01D 25/12* (2013.01); *F02C 9/18* (2013.01); *F01D 21/00* (2013.01); *F05D 2260/20* (2013.01); *F05D 2260/90* (2013.01)

(58) Field of Classification Search
CPC ...... F02C 7/12; F02C 7/16; F02C 7/18; F02C 6/08; F02C 9/18; F01D 25/08; F01D 25/12; F01D 21/00; F01D 21/06; B64D 33/08
See application file for complete search history.

(56) References Cited

U.S. PATENT DOCUMENTS

| | | | | |
|---|---|---|---|---|
| 4,441,314 A | * | 4/1984 | Fitton | F01D 11/24 |
| | | | | 60/266 |
| 8,641,362 B1 | * | 2/2014 | Liang | F01D 9/065 |
| | | | | 415/115 |
| 9,260,974 B2 | * | 2/2016 | Hasting | F01D 11/20 |
| 10,583,933 B2 | * | 3/2020 | Elbibary | B64D 27/16 |
| 10,760,489 B2 | * | 9/2020 | Tateiwa | F02C 7/16 |
| 11,047,306 B1 | | 6/2021 | Millhaem et al. | |
| 11,384,690 B2 | | 7/2022 | Bayraktar et al. | |
| 11,536,198 B2 | | 12/2022 | Millhaem et al. | |
| 11,913,388 B2 | | 2/2024 | Eryilmaz et al. | |
| 12,031,484 B2 | * | 7/2024 | Millhaem | F02C 7/18 |
| 2014/0123675 A1 | * | 5/2014 | Tham | F01D 5/088 |
| | | | | 60/782 |

(Continued)

FOREIGN PATENT DOCUMENTS

FR     3053727 A1 *   1/2018   .............. F01D 11/24

*Primary Examiner* — Alain Chau

(74) *Attorney, Agent, or Firm* — Bachman & LaPointe, P.C.

(57)     ABSTRACT

A suction enabled post shutdown combustor cooling and ventilation system including a pump fluidly coupled with a suction line, wherein the suction line is fluidly coupled with suction ports proximate a fuel system component near the combustor; a pump suction valve positioned in the suction line upstream of the pump; a pump discharge line fluidly coupled with the pump, an outlet fluidly coupled with the pump discharge line; and an engine core flow path fluidly coupled with the suction ports.

18 Claims, 3 Drawing Sheets

(56)　　　　　　References Cited

U.S. PATENT DOCUMENTS

| | | | |
|---|---|---|---|
| 2015/0252683 A1* | 9/2015 | Hasting | F02C 6/08 |
| | | | 415/176 |
| 2015/0308340 A1* | 10/2015 | Tateiwa | F02C 7/16 |
| | | | 415/178 |
| 2015/0322866 A1* | 11/2015 | Scipio | F02C 9/18 |
| | | | 415/1 |
| 2018/0134407 A1* | 5/2018 | Elbibary | B64D 27/16 |
| 2022/0235706 A1* | 7/2022 | Millhaem | F02C 6/08 |
| 2022/0235707 A1* | 7/2022 | Millhaem | F02C 6/08 |

* cited by examiner

SUCTION ENABLED POST SHUTDOWN COMBUSTOR COOLING AND CORE VENTILATION

BACKGROUND

The present disclosure is directed to the improved suction enabled post shutdown combustor cooling and ventilation system.

During normal operations, temperatures of gas turbine engine components are maintained within allowable limits by a plurality of cooling processes that transfer heat from the components to one or more heat sinks. When the engine is shutdown, most cooling systems no longer operate. As seen in FIG. 1, residual heat in certain engine components can be transferred (i.e.; "soakback") from the bore area, gas path, and cases and subsequently increase the temperature of other engine components beyond allowable limits.

A particular concern is the formation of carbon (or "coke") deposits in fuel carrying components including fuel nozzles when a hydrocarbon fuel (liquid or gas) is exposed to high temperatures in the presence of oxygen.

Coking can occur in fuel nozzles, fuel tubes, oil tubes, and drain tubes. Coking in the fuel nozzle can cause costly outcomes such as engine start issues, inefficient consumption and non-uniform combustion leading to accelerated part distress and engine in-flight shutdowns.

SUMMARY

In accordance with the present disclosure, there is provided a suction enabled post shutdown combustor cooling and ventilation system comprising a pump fluidly coupled with a suction line, wherein the suction line is fluidly coupled with suction ports proximate a fuel system component near a combustor; a pump suction valve positioned in the suction line upstream of the pump; a pump discharge line fluidly coupled with the pump, an outlet fluidly coupled with the pump discharge line; and an engine core flow path fluidly coupled with the suction ports.

A further embodiment of any of the foregoing embodiments may additionally and/or alternatively include the suction enabled post shutdown combustor cooling and ventilation system further comprising a core compartment supply line fluidly coupled with a turbine cooling air port, the core compartment supply line comprising a core compartment inlet located within a core compartment and fluidly coupled with the core compartment, the core compartment supply line comprising a core compartment supply valve located in the core compartment supply line upstream of the turbine cooling air port; a turbine cooling air supply line fluidly coupled to the core compartment supply line and the turbine cooling air port, the turbine cooling air supply line comprising a turbine cooling air valve.

A further embodiment of any of the foregoing embodiments may additionally and/or alternatively include the turbine cooling air valve is configured as closed responsive to an engine shutdown condition; and the pump suction valve and the core compartment supply valve are configured as opened responsive to the engine shutdown condition.

A further embodiment of any of the foregoing embodiments may additionally and/or alternatively include the suction enabled post shutdown combustor cooling and ventilation system further comprising a blower fluidly coupled with the core compartment supply line.

A further embodiment of any of the foregoing embodiments may additionally and/or alternatively include the turbine cooling air valve is configured as opened responsive to an engine operating condition; and the pump suction valve and the core compartment supply valve are configured as closed responsive to the engine operation condition.

A further embodiment of any of the foregoing embodiments may additionally and/or alternatively include the outlet is fluidly coupled with a fan bypass duct and/or the outlet is fluidly coupled with an air dump section.

A further embodiment of any of the foregoing embodiments may additionally and/or alternatively include the engine core flow path is in fluid communication between a compressor, the combustor and a turbine.

In accordance with the present disclosure, there is provided a gas turbine engine having a suction enabled post shutdown combustor cooling and ventilation system comprising a gas turbine engine core flow path extending through a compressor, a combustor and a turbine, the turbine comprising turbine cooling air ports; a pump fluidly coupled with a suction line, wherein the suction line is fluidly coupled with suction ports proximate a fuel system component near the combustor; a pump suction valve positioned in the suction line upstream of the pump; a pump discharge line fluidly coupled with the pump, an outlet fluidly coupled with the pump discharge line; a core compartment supply line fluidly coupled with the turbine cooling air ports, the core compartment supply line comprising a core compartment inlet located within a core compartment and fluidly coupled with the core compartment, the core compartment supply line comprising a core compartment supply valve located in the core compartment supply line upstream of the turbine cooling air ports; a turbine cooling air supply line fluidly coupled to the core compartment supply line and the turbine cooling air ports, the turbine cooling air supply line comprising a turbine cooling air valve; and the gas turbine engine core flow path fluidly coupled with the suction ports and the turbine cooling air ports.

A further embodiment of any of the foregoing embodiments may additionally and/or alternatively include the turbine cooling air valve is configured as closed responsive to an engine shutdown condition; and the pump suction valve and the core compartment supply valve are configured as opened responsive to the engine shutdown condition.

A further embodiment of any of the foregoing embodiments may additionally and/or alternatively include the turbine cooling air valve is configured as opened responsive to an engine operating condition; and the pump suction valve and the core compartment supply valve are configured as closed responsive to the engine operation condition.

A further embodiment of any of the foregoing embodiments may additionally and/or alternatively include the outlet is fluidly coupled with a fan bypass duct.

A further embodiment of any of the foregoing embodiments may additionally and/or alternatively include multiple sets of core compartment air supply lines are configured in an array about a centerline of the gas turbine engine; and multiple sets of suction lines and at least one pump are plumbed in the gas turbine engine.

A further embodiment of any of the foregoing embodiments may additionally and/or alternatively include the gas turbine engine having a suction enabled post shutdown combustor cooling and ventilation system further comprising a blower fluidly coupled with the core compartment supply line.

In accordance with the present disclosure, there is provided a process for post shutdown combustor cooling and ventilation in a gas turbine engine having a suction enabled post shutdown system comprising a gas turbine engine core flow path extending through a compressor, a combustor and a turbine, the turbine comprising turbine cooling air ports; fluidly coupling a pump with a suction line; fluidly coupling the suction line with suction ports proximate a fuel system component near the combustor; positioning a pump suction valve in the suction line upstream of the pump; fluidly coupling a pump discharge line with the pump, fluidly coupling an outlet with the pump discharge line; fluidly coupling a core compartment supply line with the turbine cooling air ports, the core compartment supply line comprising a core compartment inlet located within a core compartment; and fluidly coupling the core compartment inlet with the core compartment, the core compartment supply line comprising a core compartment supply valve located in the core compartment supply line upstream of the turbine cooling air ports; fluidly coupling a turbine cooling air supply line to the core compartment supply line and the turbine cooling air ports, the turbine cooling air supply line comprising a turbine cooling air valve; and fluidly coupling the gas turbine engine core flow path with the suction ports and the turbine cooling air ports.

A further embodiment of any of the foregoing embodiments may additionally and/or alternatively include the process further comprising closing the turbine cooling air valve responsive to an engine shutdown condition; and opening the pump suction valve and the core compartment supply valve responsive to the engine shutdown condition.

A further embodiment of any of the foregoing embodiments may additionally and/or alternatively include the process further comprising opening the turbine cooling air valve responsive to an engine operating condition; and closing the pump suction valve and the core compartment supply valve responsive to the engine operation condition.

A further embodiment of any of the foregoing embodiments may additionally and/or alternatively include the process further comprising fluidly coupling a blower with the core compartment supply line.

A further embodiment of any of the foregoing embodiments may additionally and/or alternatively include the process further comprising fluidly coupling the outlet with a fan bypass duct.

A further embodiment of any of the foregoing embodiments may additionally and/or alternatively include the process further comprising fluidly coupling the outlet with an air dump section.

A further embodiment of any of the foregoing embodiments may additionally and/or alternatively include the process further comprising removing core compartment air from the core compartment near upper portions of the gas turbine engine responsive to hot air rising upward into the upper portions during a post shutdown condition.

The disclosed system cools the air in the combustor cavity by drawing in air from the core flow path and promoting airflow through the combustor from aft to forward so that hot air can be dumped to the fan bypass air stream. The invention reduces/removes the coking risk at the fuel nozzles, and it also helps with core ventilation to reduce coking risk in the fuel manifolds and other fuel & oil tubes post engine shutdown which helps other hardware & components in the core area Other details of the suction enabled post shutdown combustor cooling and ventilation system are set forth in the following detailed description and the accompanying drawings wherein like reference numerals depict like elements.

DETAILED DESCRIPTION

Figure 1:
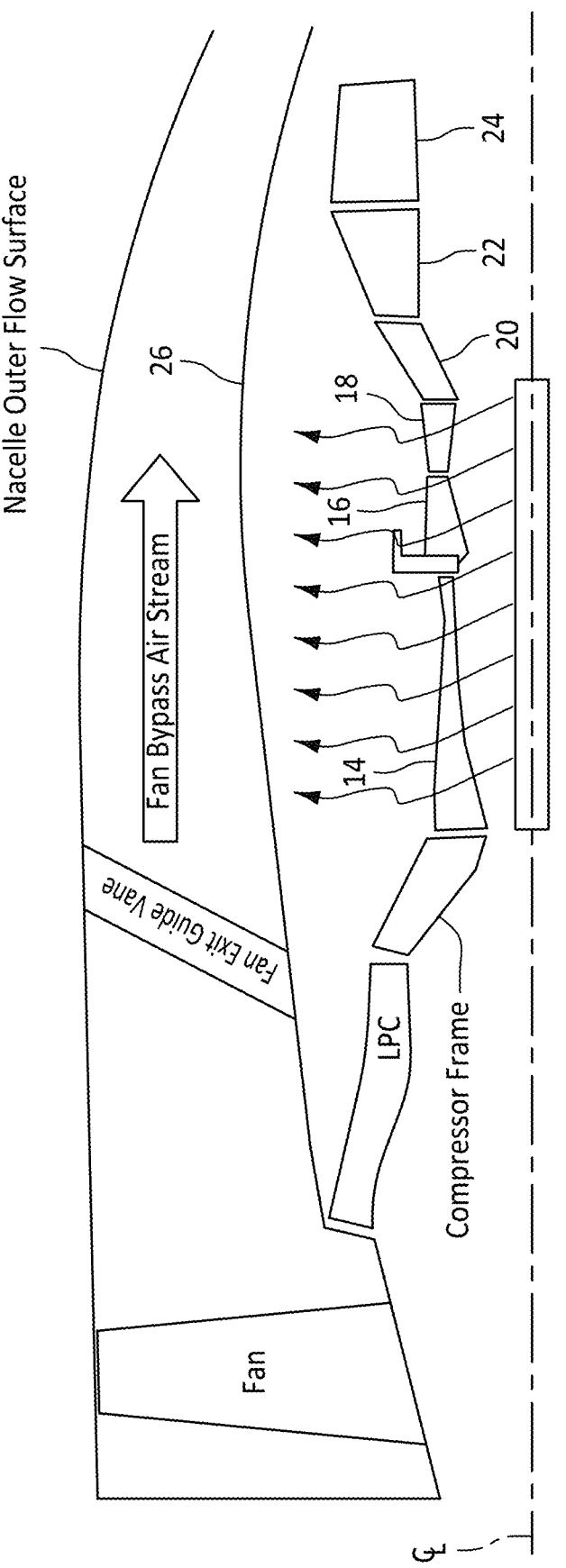
FIG. 1 is a cross-sectional view of a schematic representation of an exemplary gas turbine engine post-shutdown.
Figure 2:
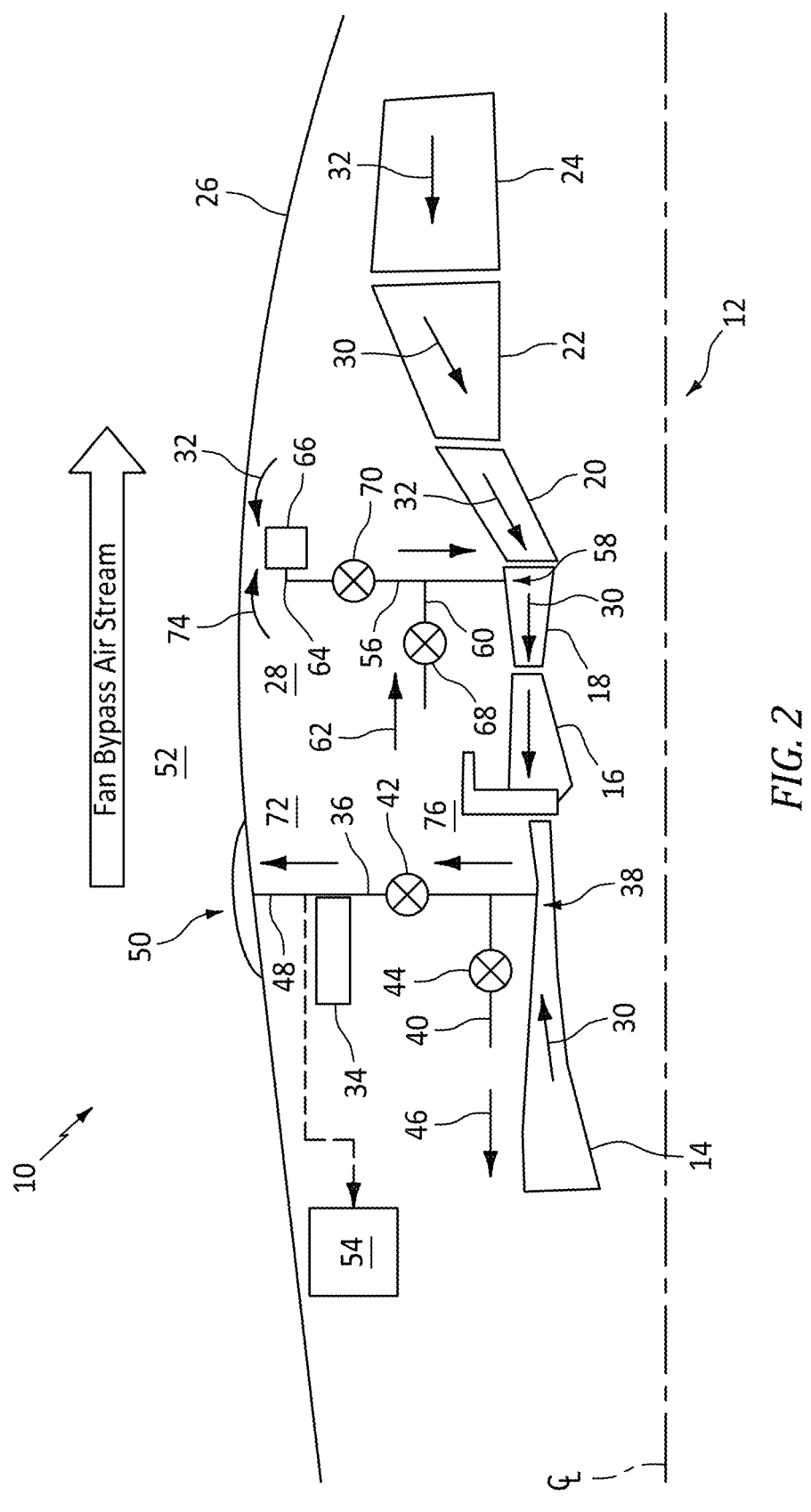
FIG. 2 is a cross-sectional view of a schematic representation of an exemplary gas turbine engine with an exemplary suction enabled post shutdown combustor cooling and ventilation system.
Figure 3:
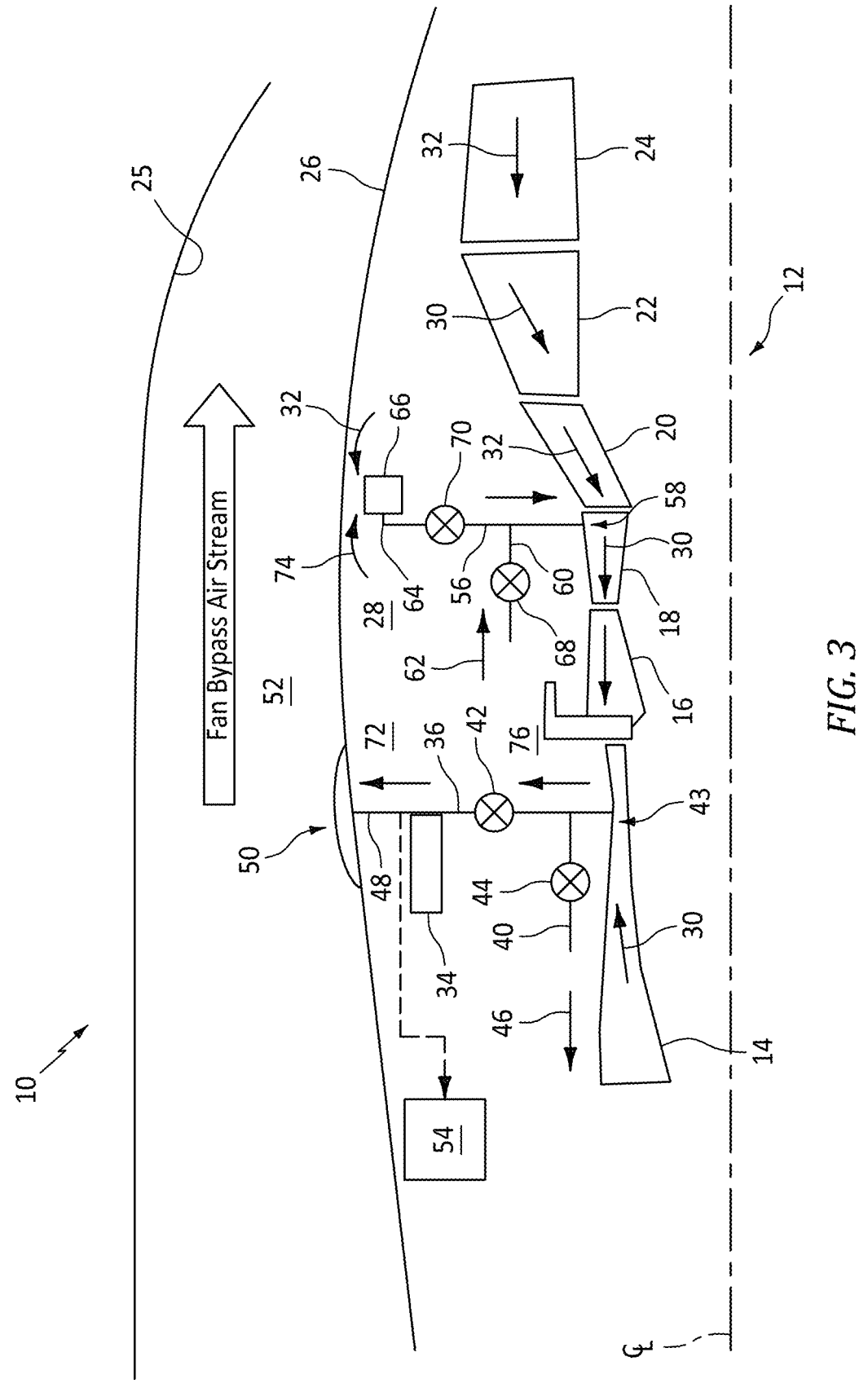
FIG. 3 is a cross-sectional view of a schematic representation of an exemplary gas turbine engine with an exemplary suction enabled post shutdown combustor cooling and ventilation system.

Referring now to FIG. 2 and FIG. 3, the exemplary suction enabled post shutdown combustor cooling and ventilation system 10 is shown. The suction enabled post shutdown combustor cooling and ventilation system or simply system 10 is shown incorporated within the gas turbine engine 12 having centerline CL. The gas turbine engine 12 includes sections listed from forward toward aft, such as, a high pressure compressor (HPC) or simply compressor 14, combustor (COMB) 16, high pressure turbine (HPT) or simply turbine 18, turbine frame 20, low pressure turbine (LPT) 22, and exhaust frame 24. A nacelle outer flow surface 25 along with a nacelle inner flow surface 26 bound the fan bypass air stream flowing in the fan bypass air duct 52.

The nacelle inner flow surface 26 is shown bounding a core compartment 28. The core compartment 28 encloses the above listed gas turbine engine 12 sections. A core flow path 30 (shown as arrows) traverses through the engine sections 14, 16, 18, 20, 22, 24 and represents a path that air can travel to provide cooling air 32 for use with the system 10.

The system 10 can include a pump 34, such as a vacuum pump fluidly coupled with a suction line 36. The suction line 36 is fluidly coupled with bleed ports 38 of the high pressure compressor, or simply compressor 14. Bleed ports 38 may alternatively or additionally be located in the combustor 16, low pressure compressor bleed, high pressure compressor bleed compressor frame and/or intermediate 2.5 bleed locations. A high pressure bleed port line, or simply bleed port line 40 is fluidly coupled with the suction line 36 proximate the bleed ports 38 and upstream of the pump 34. The high pressure bleed port line 40 is employed during operation of the engine 12. In an alternative embodiment, the gas turbine engine 12 may not have bleed ports 38 or bleed port line 40.

A pump suction valve 42 is positioned in the suction line 36 upstream of the pump 34. The pump suction valve 42 can be operated to control the flow of cooling air 32 being pumped/drawn in by the pump 34 through the suction line 36. The pump suction valve 42 can be closed during normal engine 12 operation and shut off flow of air through the suction line 36 and shut off flow through the pump 34. During operation of the system 10, the pump suction valve 42 can be opened and allow for cooling air 32 to flow through the suction line 36 to the pump 34. The suction line 36 can be fluidly coupled with the high pressure compressor 14 and/or a fuel system component 76 near the combustor or the combustor 16 through suction ports 43 formed for the purpose of the bleedless system 10 shown in FIG. 3.

A high pressure bleed valve 44 can be positioned in the high pressure bleed port line 40 upstream of the pump suction valve 42. The high pressure bleed valve 44 can be operated to control the flow of air through the bleed ports 38 to the high pressure bleed port line 40. The high pressure bleed valve 44 can be open during normal engine 12 operation allowing bleed air 46 to flow through the high pressure bleed port line 40 from the bleed ports 38. The high pressure bleed valve 44 can be closed during operation of the system 10, to allow for cooling air 32 to be pumped/drawn into the suction line 36 from the bleed ports 38.

In the embodiment shown at FIG. 3, there is no bleed port line 40 and no bleed ports 38. The pump suction valve 42 can be controlled to allow cooling air 32 to flow from the core flow path 30 to the suction line 36. During normal operation of the gas turbine engine 12 the pump suction valve 42 can be closed.

The pump 34 can be fluidly coupled with a pump discharge line 48. The pump discharge line 48 can be fluidly coupled with an outlet 50 fluidly coupled with the fan bypass duct 52. The outlet 50 can be configured as a nacelle air scoop formed in the nacelle inner flow surface 26. In an alternative embodiment, the pump discharge line 48 can also be fluidly coupled with an air dump section 54 including at least one of a diffuser case, a high pressure compressor case and/or a 2.5 compartment to allow for the cooling air 32 to be discharged from the pump 34.

The system 10 can include a core compartment supply line 56 fluidly coupled with high pressure turbine cooling air ports 58. The high pressure turbine cooling air ports 58 are fluidly coupled with a turbine cooling air supply line 60. The turbine cooling air supply line 60 is also fluidly coupled with the core compartment supply line 56. The turbine cooling air supply line 60 is configured to supply turbine cooling air 62 to the high pressure turbine cooling air ports 58 during engine 12 operation.

The core compartment supply line 56 includes a core compartment inlet 64 located within the core compartment 28. The core compartment inlet 64 is fluidly coupled with the core compartment 28 and configured to pull cooling air 32 from the core compartment 28 during system 10 operation.

In an alternative embodiment, a blower 66 can be fluidly coupled with the core compartment supply line 56. The blower 66 can assist the pump 34 with circulating cooling air 32 from the core compartment 28 into the core compartment supply line 56 and through the (high pressure) turbine cooling air ports 58.

A turbine cooling air valve 68 can be located in the turbine cooling air line 60. The turbine cooling air valve 68 can be in the open position during normal engine 12 operation to supply turbine cooling air 62 to the ports 58. The turbine cooling air valve 68 can be in the closed position during system 10 operation, to allow for cooling air 32 to flow through the core compartment supply line 56 and through the (high pressure) turbine cooling air ports 58.

A core compartment supply valve 70 can be located in the core compartment supply line 56 upstream of the ports 58. The core compartment supply valve 70 can be closed during normal engine 12 operation. The core compartment supply valve 70 can be opened during system 10 operation to allow for cooling air 32 to flow into the core compartment inlet 64 through the core compartment supply line 56 and into the ports 58 ultimately flowing to the pump 34.

The pump 34 and the blower 66 can be powered from available power during the engine shutdown condition, such as battery or ground supplied power.

The system 10 can operate during gas turbine engine 12 shutdown conditions. The (high pressure) bleed valve 44 and the turbine cooling air valve 68 can be closed. In the bleedless configuration shown at FIG. 3, there is no high pressure bleed valve 44 or high pressure bleed port line 40. The pump suction valve 42 and the core compartment supply valve 70 can be opened. The pump 34 can be activated and draw a suction upstream through the suction line 36 as well as through the suction ports 43. The suction at the suction ports 43 can influence the air along the core flow path 30 and draw a portion of the air within the core flow path 30 into the suction ports 43 and toward the pump 34. Additionally, the suction from the pump 34 can influence the cooing air 32 within the core compartment 28 and draw the cooling air 32 from the core compartment 28 into the core compartment inlet 64 through the core compartment supply line 56 through the turbine cooling air ports 58 into the core flow path 30 through the combustor (combustor cavity) 16 and through the suction ports 43 into the pump 34 and ultimately discharge out through the outlet 50.

The system 10 can operate to draw cooling air 32 through the engine 12 to prevent engine components vulnerable to coking, such as fuel system components 76 near the combustor 16. The system 10 can be configured for suppressing a coking point temperature, such as about 250 degrees Fahrenheit for GP8 fuel.

It is contemplated that the system 10 can include multiple sets of core compartment air supply lines 56 in an array about the centerline CL of the engine 12. There can also be multiple sets of suction lines 36 and pumps 34 plumbed in the engine 12, placed strategically to move the optimum cooling air 32 through the combustor section 16. In an exemplary embodiment, the system 10 can be configured to remove the cooling air 32 from the core compartment 28 in the array near upper portions 72 (relative to gravity) such as top dead center, of the engine 12, responsive to the hot air during the soak back tending to rise upward into those upper portions 72.

It is contemplated that the system 10 can suck cooling air 32 from the core flow path 30 (follow the arrows) with existing tubes and HPC discharge bleed ports 38 via the system 10 shown in FIG. 2. It is also contemplated that the system 10 can draw cooling air 32 from the core flow path 30 (follow the arrows) with tubes and suction ports 43 via the system 10 shown in FIG. 3. It is desirable to preferentially select the cooling air 32 from aft of the suction ports 43, a path for core compartment air 74 to enter the flow path through HPT TCA ports 58 is opened. This encourages air 32 to move from aft of the combustor 16 (from turbine gas path cavity) to in front of the combustor 16 (to compressor gas path cavity). This flow of air 32 through the combustor 16 allows the heat released from the bores of high spool disks to escape the engine cases, and more specifically the combustor 16 rather than soaking into fuel system components 76 including fuel nozzles, fuel nozzle arrays, and fuel manifolds, fuel drain tubes. The warmed air 32 is drawn from the combustor 16 cavity with the vacuum pump 34 and dumped to the fan bypass duct 52 through the outlet 50 (a nacelle scoop or other fluid connection 54). The core compartment air 74 is pumped into the system 10 from the core compartment 28 providing the benefit of venting the core compartment 28. The valves 42 and 68 can be integrated together with other engine 12 secondary flow valves.

A technical advantage of the disclosed suction enabled post shutdown combustor cooling and ventilation system includes a system configured for engine post shutdown fuel nozzle, fuel tubes, oil tubes, and drain tubes coking prevention.

Another technical advantage of the disclosed suction enabled post shutdown combustor cooling and ventilation system includes a system configured to interrupt post shutdown convective core flow that causes coking.

Another technical advantage of the disclosed suction enabled post shutdown combustor cooling and ventilation system includes a system that is configured to ventilate the core flow path during shutdown conditions.

Another technical advantage of the disclosed suction enabled post shutdown combustor cooling and ventilation system includes preventing costly component failure modes resulting from coking.

Another technical advantage of the disclosed suction enabled post shutdown combustor cooling and ventilation system includes a system that removes/reduces the risk of coking at the combustor section.

There has been provided a suction enabled post shutdown combustor cooling and ventilation system. While the suction enabled post shutdown combustor cooling and ventilation system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A suction enabled post shutdown combustor cooling and ventilation system comprising:
   a pump fluidly coupled downstream of a suction line, wherein the suction line is fluidly coupled downstream of suction ports proximate a fuel system component near a combustor;
   a pump suction valve positioned in the suction line upstream of the pump and downstream from the suction ports;
   a pump discharge line fluidly coupled downstream from the pump,
   an outlet fluidly coupled downstream from the pump discharge line;
   an engine core flow path fluidly coupled with the suction ports;
   a core compartment supply line fluidly coupled upstream from a turbine cooling air port, the core compartment supply line comprising a core compartment inlet located within a core compartment and fluidly coupled the core compartment, the core compartment supply line comprising a core compartment supply valve located in the core compartment supply line upstream of the turbine cooling air port;
   a turbine cooling air supply line fluidly coupled to the core compartment supply line and the turbine cooling air port, the turbine cooling air supply line comprising a turbine cooling air valve upstream of the core compartment supply line; wherein the pump is structurally configured to remove air from the core compartment through the core compartment inlet and through the core compartment supply line and through the turbine cooling air port and through the engine core flow path and the pump is structurally configured to discharge the air from the core compartment through the outlet.

2. The suction enabled post shutdown combustor cooling and ventilation system according to claim 1, wherein the turbine cooling air valve is configured as closed responsive to an engine shutdown condition; and
   the pump suction valve and the core compartment supply valve are configured as opened responsive to the engine shutdown condition.

3. The suction enabled post shutdown combustor cooling and ventilation system according to claim 1, further comprising:
   a blower fluidly coupled with the core compartment supply line.

4. The suction enabled post shutdown combustor cooling and ventilation system according to claim 1, wherein the turbine cooling air valve is configured as opened responsive to an engine operating condition; and
   the pump suction valve and the core compartment supply valve are configured as closed responsive to the engine operation condition.

5. The suction enabled post shutdown combustor cooling and ventilation system according to claim 1, wherein the outlet is fluidly coupled with a fan bypass duct and/or the outlet is fluidly coupled with an air dump section.

6. The suction enabled post shutdown combustor cooling and ventilation system according to claim 1, wherein the engine core flow path is in fluid communication between the compressor, the combustor and the turbine.

7. A gas turbine engine having a suction enabled post shutdown combustor cooling and ventilation system comprising:
   a gas turbine engine core flow path extending through a compressor, a combustor and a turbine, the turbine comprising turbine cooling air ports;
   a pump fluidly coupled downstream of a suction line, wherein the suction line is fluidly coupled downstream of suction ports proximate a fuel system component near the combustor;
   a pump suction valve positioned in the suction line upstream of the pump and downstream from the suction ports;
   a pump discharge line fluidly coupled downstream from the pump,
   an outlet fluidly coupled downstream from the pump discharge line;
   a core compartment supply line fluidly coupled upstream of the turbine cooling air ports, the core compartment supply line comprising a core compartment inlet located within a core compartment and fluidly coupled the core compartment, the core compartment fluidly coupled upstream of the core compartment inlet and the core compartment fluidly coupled upstream of the pump, the core compartment supply line comprising a core compartment supply valve located in the core compartment supply line upstream of the turbine cooling air ports;
   a turbine cooling air supply line fluidly coupled to the core compartment supply line and the turbine cooling air ports, the turbine cooling air supply line comprising a turbine cooling air valve; and
   the gas turbine engine core flow path fluidly coupled the suction ports and the turbine cooling air ports.

8. The gas turbine engine having a suction enabled post shutdown combustor cooling and ventilation system according to claim 7, wherein the turbine cooling air valve is configured as closed responsive to an engine shutdown condition; and
   the pump suction valve and the core compartment supply valve are configured as opened responsive to the engine shutdown condition.

9. The gas turbine engine having a suction enabled post shutdown combustor cooling and ventilation system according to claim 7, wherein the turbine cooling air valve is configured as opened responsive to an engine operating condition; and the pump suction valve and the core compartment supply valve are configured as closed responsive to the engine operation condition.

10. The gas turbine engine having a suction enabled post shutdown combustor cooling and ventilation system according to claim 7, wherein the outlet is fluidly coupled with a fan bypass duct.

11. The gas turbine engine having a suction enabled post shutdown combustor cooling and ventilation system according to claim 7, wherein multiple sets of core compartment air supply lines are configured in an array about a centerline of the gas turbine engine; and multiple sets of suction lines and at least one pump are plumbed in the gas turbine engine.

12. The gas turbine engine having a suction enabled post shutdown combustor cooling and ventilation system according to claim 7, further comprising:

a blower fluidly coupled with the core compartment supply line.

13. A process for post shutdown combustor cooling and ventilation in a gas turbine engine having a suction enabled post shutdown system comprising:

a gas turbine engine core flow path extending through a compressor, a combustor and a turbine, the compressor comprising suction ports, the turbine comprising turbine cooling air ports;

fluidly coupling a pump with a suction line; fluidly coupling the suction line suction ports proximate a fuel system component near the combustor;

positioning a pump suction valve in the suction line upstream of the pump;

fluidly coupling a pump discharge line with the pump, fluidly coupling an outlet with the pump discharge line;

fluidly coupling a core compartment supply line with the turbine cooling air ports, the core compartment supply line comprising a core compartment inlet located within a core compartment; and fluidly coupling the core compartment inlet with the core compartment, the core compartment supply line comprising a core compartment supply valve located in the core compartment supply line upstream of the turbine cooling air ports;

fluidly coupling a turbine cooling air supply line to the core compartment supply line and the turbine cooling air ports, the turbine cooling air supply line comprising a turbine cooling air valve;

fluidly coupling the gas turbine engine core flow path with the suction ports and the turbine cooling air ports; and closing the turbine cooling air valve responsive to an engine shutdown condition; and opening the pump suction valve and the core compartment supply valve responsive to the engine shutdown condition.

14. The process of claim 13, further comprising:

opening the turbine cooling air valve responsive to an engine operating condition; and closing the pump suction valve and the core compartment supply valve responsive to the engine operation condition.

15. The process of claim 13, further comprising:

fluidly coupling a blower with the core compartment supply line.

16. The process of claim 13, further comprising:

fluidly coupling the outlet with a fan bypass duct.

17. The process of claim 13, further comprising:

fluidly coupling the outlet with an air dump section.

18. The process of claim 13, further comprising:

removing core compartment air from the core compartment near upper portions of the gas turbine engine responsive to hot air rising upward into the upper portions during a post shutdown condition.

* * * * *